(12) United States Patent
Grace et al.

(10) Patent No.: US 12,118,883 B2
(45) Date of Patent: Oct. 15, 2024

(54) UTILIZATION OF REFLECTIVITY TO DETERMINE CHANGES TO TRAFFIC INFRASTRUCTURE ELEMENTS

(71) Applicant: GM Cruise Holdings LLC, San Francisco, CA (US)

(72) Inventors: Nestor Grace, San Francisco, CA (US); Dogan Gidon, Berkeley, CA (US); Diego Plascencia-Vega, San Francisco, CA (US); Srishti Iyer Koduvayur, Emeryville, CA (US); Hooman Barekatain, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 300 days.

(21) Appl. No.: 16/849,657

(22) Filed: Apr. 15, 2020

(65) Prior Publication Data

US 2021/0327269 A1     Oct. 21, 2021

(51) Int. Cl.
*G08G 1/0967*     (2006.01)
*G01C 21/30*     (2006.01)
*G01S 17/89*     (2020.01)
*G05D 1/00*     (2024.01)

(52) U.S. Cl.
CPC ....... *G08G 1/096725* (2013.01); *G01C 21/30* (2013.01); *G01S 17/89* (2013.01); *G05D 1/0088* (2013.01); *G05D 1/0274* (2013.01); *G05D 1/0285* (2013.01)

(58) Field of Classification Search
CPC ... G01C 21/30; G01C 21/3822; G01S 7/4802; G01S 17/89; G01S 17/931; G05D 1/088; G05D 1/0274; G05D 1/0285; G05D 2201/0213; G06V 20/582; G08G 1/0112; G08G 1/0129; G08G 1/0141; G08G 1/04;
(Continued)

(56) References Cited

U.S. PATENT DOCUMENTS 8,063,797 B1 * 11/2011 Sonnabend .......... G08G 1/0129
                                          340/932.2
9,141,109 B1 * 9/2015 Kamata .................. G08B 21/02
10,134,278 B1 * 11/2018 Konrardy .............. G08G 1/166
(Continued)

OTHER PUBLICATIONS

R. P. D. Vivacqua, M. Bertozzi, P. Cerri, F. N. Martins and R. F. Vassallo, "Self-Localization Based on Visual Lane Marking Maps: An Accurate Low-Cost Approach for Autonomous Driving," in IEEE Transactions on Intelligent Transportation Systems, vol. 19, No. 2, pp. 582-597, Feb. 2018, doi: 10.1109/TITS.2017.2752461.*
(Continued)

*Primary Examiner* — Jason Holloway
*Assistant Examiner* — Blake A Wood

(57) ABSTRACT

Systems, methods, and computer-readable media are provided for analyzing a traffic infrastructure element, determining reflectivity information of the traffic infrastructure element based on the analyzing of the traffic infrastructure element, comparing the reflectivity information of the traffic infrastructure element with semantic map information of the traffic infrastructure element, and providing instructions to an autonomous vehicle based on the comparing of the reflectivity information of the traffic infrastructure element with the semantic map information of the traffic infrastructure element.

21 Claims, 6 Drawing Sheets

(58) Field of Classification Search
CPC ......... G08G 1/09675; G08G 1/096775; G08G 1/096725; H04W 4/44
See application file for complete search history.

(56) References Cited

U.S. PATENT DOCUMENTS

| | | | | |
|---|---|---|---|---|
| 2002/0186865 | A1* | 12/2002 | Retterath | G08G 1/0962 382/104 |
| 2009/0228204 | A1* | 9/2009 | Zavoli | G01C 21/30 701/532 |
| 2016/0117922 | A1* | 4/2016 | Oh | G01C 21/3691 348/118 |
| 2018/0120857 | A1* | 5/2018 | Kappauf | G01C 21/362 |
| 2019/0114493 | A1* | 4/2019 | Ewert | G05D 1/0246 |
| 2020/0114923 | A1* | 4/2020 | Kato | G01C 21/3602 |
| 2020/0189390 | A1* | 6/2020 | Viswanathan | G06V 20/64 |
| 2020/0393261 | A1* | 12/2020 | Zhang | G08G 1/0133 |
| 2020/0401823 | A1* | 12/2020 | Miller | G06V 10/82 |
| 2021/0004613 | A1* | 1/2021 | Yang | G06V 20/56 |
| 2021/0199461 | A1* | 7/2021 | Raina | G01C 21/3673 |

OTHER PUBLICATIONS

B. Riveiro, L. Díaz-Vilariño, B. Conde-Carnero, M. Soilán and P. Arias, "Automatic Segmentation and Shape-Based Classification of Retro-Reflective Traffic Signs from Mobile LiDAR Data," in IEEE Journal of Selected Topics in Applied Earth Observations and Remote Sensing, vol. 9, No. 1, pp. 295-303, Jan. 2016, doi.*

* cited by examiner

UTILIZATION OF REFLECTIVITY TO DETERMINE CHANGES TO TRAFFIC INFRASTRUCTURE ELEMENTS

BACKGROUND

1. Technical Field

The subject technology provides solutions for roadway infrastructure elements, and in particular, for determining changes in roadway infrastructure elements based on reflectivity.

2. Introduction

When operating an autonomous vehicle fleet, the health and utilization of the traffic infrastructure is important. Degraded traffic infrastructure affects service quality and can lead to disruption and higher accident rates, thereby causing the autonomous vehicle to deviate from its intended path, causing damage to the autonomous vehicle, or causing a degradation in rider safety and comfort. For example, missing stop signs can compromise the ability of the autonomous vehicle to navigate intersections safely as this may cause the other road actors' behaviors more unpredictable. In general, poor/missing infrastructure elements (e.g., poor/missing signage lane markings, etc.) make it more difficult to navigate, which causes traffic jams, impacts trip time and service quality, and compromises safety.

Moreover, there is no centralized unit such as a city that maintains the traffic infrastructure as each instance of degradation is handled on a case-by-case basis as they are reported. A complete picture of the state of the traffic infrastructure including degraded elements (e.g., missing/vandalized signage) and problematic areas (e.g., frequently congested areas) is of high value to any organization such as a city as a planning tool and a means to prioritize construction efforts.

As such, a need exists for a system and a method that can efficiently and effectively detect changes in roadway infrastructure elements based on reflectivity, thereby allowing for rapid and safe route determination.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Figure 1:
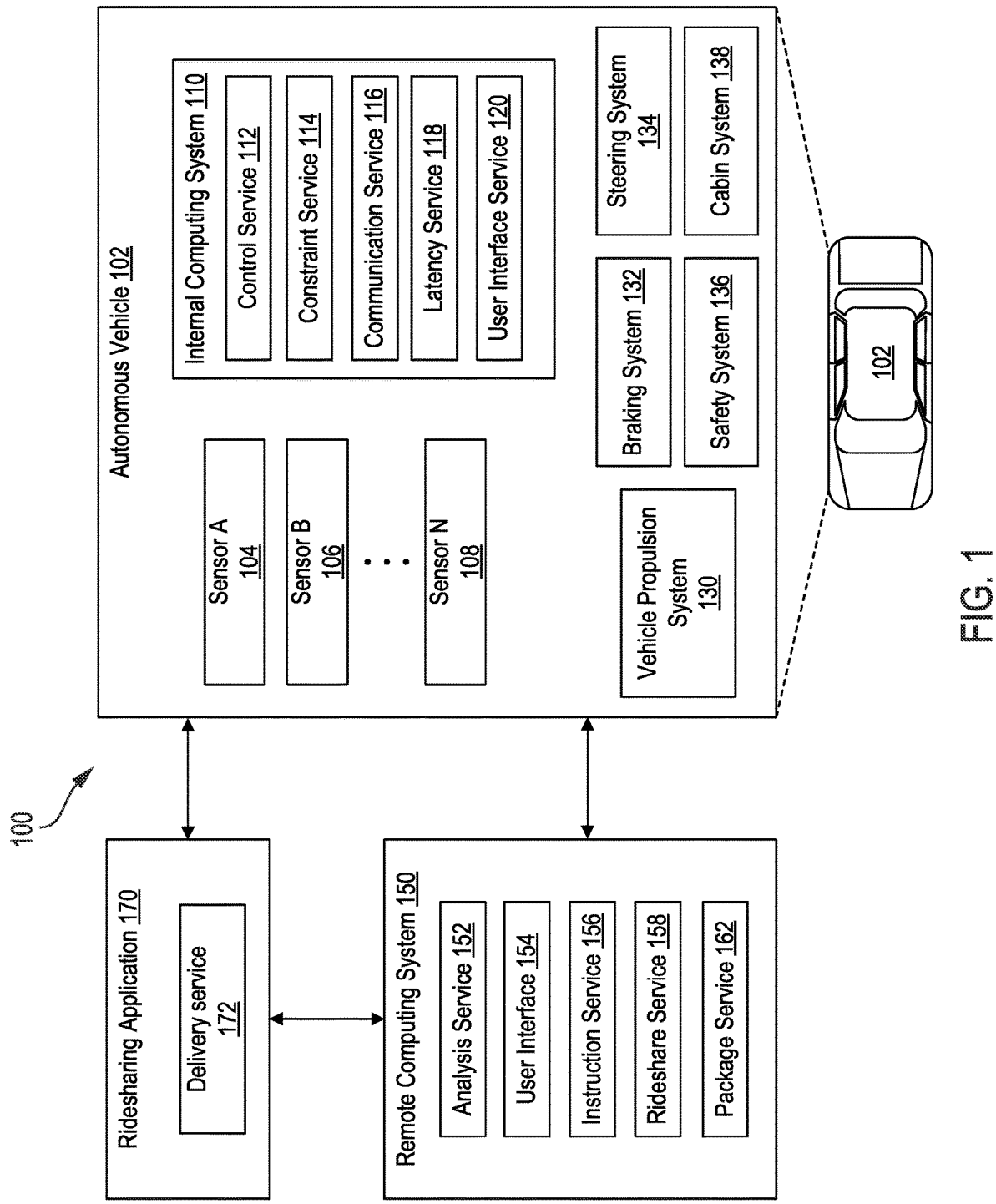
FIG. 1 illustrates an example environment that includes an autonomous vehicle in communication with a remote computing system, according to some aspects of the disclosed technology.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), 3rd Generation (3G), 5th Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

When operating an autonomous vehicle fleet, the health and utilization of the traffic infrastructure is important. Degraded traffic infrastructure affects service quality and can lead to disruption and higher accident rates, thereby causing the autonomous vehicle to deviate from its intended path, causing damage to the autonomous vehicle, or causing a degradation in rider safety and comfort. For example, missing stop signs can compromise the ability of the autonomous vehicle to navigate intersections safely as this may cause the other road actors' behaviors more unpredictable. In general, poor/missing infrastructure elements (e.g., poor/missing signage lane markings, etc.) make it more difficult to navigate, which causes traffic jams, impacts trip time and service quality, and compromises safety.

Moreover, there is no centralized unit such as a city that maintains the traffic infrastructure as each instance of degradation is handled on a case-by-case basis as they are reported. A complete picture of the state of the traffic infrastructure including degraded elements (e.g., missing/vandalized signage) and problematic areas (e.g., frequently congested areas) is of high value to any organization such as a city as a planning tool and a means to prioritize construction efforts.

As such, a need exists for a system and a method that can efficiently and effectively detect changes in roadway infrastructure elements based on reflectivity, thereby allowing for rapid and safe route determination.

Figure 2:
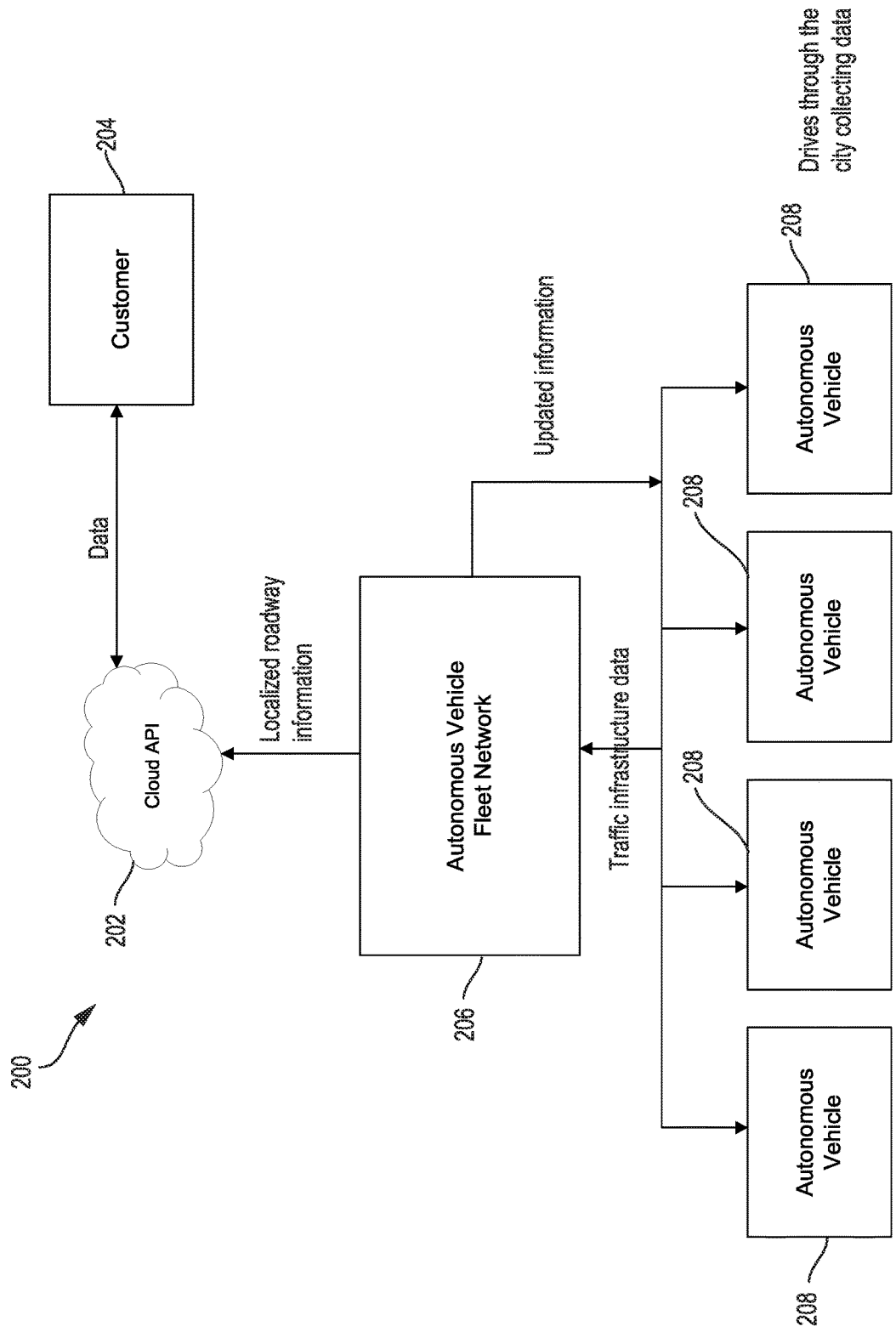
FIG. 2 illustrates an example flow chart of a degrading traffic infrastructure system, according to some aspects of the disclosed technology.

FIG. 2 illustrates an example flow chart of a degrading traffic infrastructure system 200, according to some aspects of the disclosed technology. In some instances, the degrading traffic infrastructure system 200 can include a cloud application programming interface (API) 202, customers 204, an autonomous vehicle fleet network 206, and autonomous vehicles 208. In some cases, the degrading traffic infrastructure system 200 can assist the autonomous vehicle fleet 208 avoid areas with degraded traffic infrastructure. In other instances, the degrading traffic infrastructure system 200 can automate compiling of traffic infrastructure information and maintain a dynamic overall picture of a city's traffic infrastructure including temporary signages and construction. The degrading traffic infrastructure system 200 can allow the traffic infrastructure information to be more consistent, objective, and increase the frequency in which the quality of the traffic infrastructures are assessed (e.g., "24/7").

The degrading traffic infrastructure system 200 can also implement a traffic infrastructure monitoring system (e.g., with the autonomous vehicles 208) that includes sensors (e.g., inertial measurement unit (IMU), wheel encoders, light detection and ranging (LiDAR), radar, and cameras in the autonomous vehicles 208). The degrading traffic infrastructure system 200 can further compute capabilities, potentially adding additional sensors (infrared (IR), ultrasonic, etc.) and computational devices. Data processing can be performed in the cloud 202 or external servers to divert additional computational resources from the autonomous vehicle computes. The sensors can be utilized to determine reflectivity of traffic infrastructure elements such as traffic signs and road signage.

In other instances, the degrading traffic infrastructure system 200 can utilize a sensor suite of LiDAR, IMUs, cameras, and radar that can provide a significant amount of information to infer and quantify the health of the traffic infrastructure such as reflectivity of traffic signs/road signage. For example, traffic infrastructure data of road signage can be collected via the sensor suite placed around the vehicle such as a downward pointing LIDAR, RADAR, camera, IR, ultrasonic distance detection, and IR thermal cameras.

In some instances, the degrading traffic infrastructure system 200 can collect and provide road and infrastructure data collection to improve ride comfort and to update blacklists to provide ride efficiency, distance, and duration. Moreover, traffic light reliability and traffic sign confusion or disappearance can be provided to third parties (e.g., cities, transportation companies, and infrastructure designers) to execute repairs, or via an API or an application ("app") for road users. The degrading traffic infrastructure system 200 also can conduct traffic usability, infrastructure and layout utilization, and safety studies while leveraging the data.

The degrading traffic infrastructure system 200 can assess and predict traffic infrastructure health, while also recommending traffic infrastructure improvements using the sensory, computational, and communication capabilities of a fleet of autonomous vehicles 208 over the operation domain/network 206. For example, reflectivity of traffic signs can be assessed to predict the "health" of the traffic sign, thereby providing data that may recommend that the traffic sign be replaced, improved, fixed, etc.

In some instances, the autonomous vehicle fleet 208 can include the unique advantage of traversing the streets of a city, state, or nation on a daily basis. In other instances, the autonomous vehicle fleet 208 can utilize high fidelity LIDAR point clouds for localization and semantic map information aggregation in a mapping stack, which can allow for a baseline to track and compare various components of the degrading traffic infrastructure system 200.

The autonomous vehicle fleet 208 can be employed to obtain detailed information on traffic infrastructure including traffic signs, lane markings, traffic signals, and any other traffic infrastructure suitable for the intended purpose and understood by a person of ordinary skill in the art. In some instances, the autonomous vehicle fleet 208 can also employ sensor sets, mathematical algorithms for interpreting data from multiple sensors, and additional measurement devices to assist in determining the reflectivity traffic infrastructure state.

In some instances, the degrading traffic infrastructure system 200 can collect traffic infrastructure data from the autonomous vehicle fleet 208, which can be communicated to the cloud 202. The cloud 202 can then process and provide the traffic infrastructure data, in-real time where applicable, via an API. The processed traffic infrastructure data can be communicated throughout the autonomous vehicle fleet 208 to inform and facilitate regular operation of the autonomous vehicles 208. For example, the degrading traffic infrastructure system 200 can include labeling and blacklisting road segments with degraded infrastructure (e.g., construction sites, missing signs, vandalized traffic signs, etc.) and routing based on a road utilization quality index (e.g., avoiding poorly signalized intersections at high traffic times).

The sensor data collected from the autonomous vehicles 208 can be utilized to compute metrics describing various aspects of the state of specific road segments. For example, a traffic infrastructure score/index for each road segment can be calculated by analyzing differences between different LiDAR scans or camera images over time and analyzing times and locations where the autonomous vehicles 208 have difficulty navigating. In some instances, specific types and modes of degradation in the traffic infrastructure can create a hazardous driving condition (e.g., missing/vandalized stop signs) can be annotated on a map used for coordinating fleet operation.

In some instances, the degrading traffic infrastructure system 200 can include examining the validity of current infrastructure (e.g., missing or damaged signage signals, and road markings that are incorrect or provide insufficient information) and analyzing the impact of affecting changes (e.g., closing a street, changing a speed limit, and which infrastructure elements may be tied to these changes). In other instances, the degrading traffic infrastructure system 200 can include a comparison of a current map and a semantic understanding of the city (e.g., whether traffic signs are in the correct location, whether lane markings are correctly placed, and whether traffic is being poorly directed). In some instances, the degrading traffic infrastructure system 200 can further utilize infrastructure visibility (e.g., lane marking visibility, sign disappearance or degradation, and traffic light outage) and roadway usage (e.g., whether other road users are utilizing the road correctly), which can provide insights into reflectivity, degradation, usability, and overall validity of the traffic infrastructure.

In other instances, the degrading traffic infrastructure system 200 can include high resolution mapping that can provide pinpoint road information in space and time. The degrading traffic infrastructure system 200 can further communicate the traffic infrastructure data to the autonomous vehicles 208 and identify potential hazards at key locations along their respective routes.

Reflectivity:

In some instances, the degrading traffic infrastructure system 200 can detect radar, LiDAR, and/or visual reflectivity/return intensity changes, some of which include various roadway infrastructure elements that can provide key insights as to their health, legibility, and validity of placement. For example, radar reflectivity can provide information regarding material changes to road signage such as differences between glass, fog, plastic, and various metals. In some instances, the degrading traffic infrastructure system 200 can detect when the material of a road sign has changed. For example, a metal sign that has been covered with a plastic sign/cover may be detected and the degrading traffic infrastructure system 200 may then provide a signal or determination that the road sign has been vandalized or tampered with.

LiDAR reflectivity changes can occur at smaller LiDAR wavelengths and can provide information regarding aspect and surface treatment of materials. For example, utilizing LiDAR reflectivity, the degrading traffic infrastructure system 200 can detect whether a retro-reflective sign has been tampered with and whether a sign has deteriorated by comparing the difference between mapped intensity data and surrounding intensity data that can include highly dense and accumulated real-time scans.

In some instances, reflectivity information of traffic infrastructure elements can include reflectivity information of the whole or a portion of the traffic infrastructure element. For example, the whole traffic infrastructure element can include the reflective red portion of a stop sign, while a portion of the traffic infrastructure element can include the reflective numbers of a speed limit sign.

Figure 3:
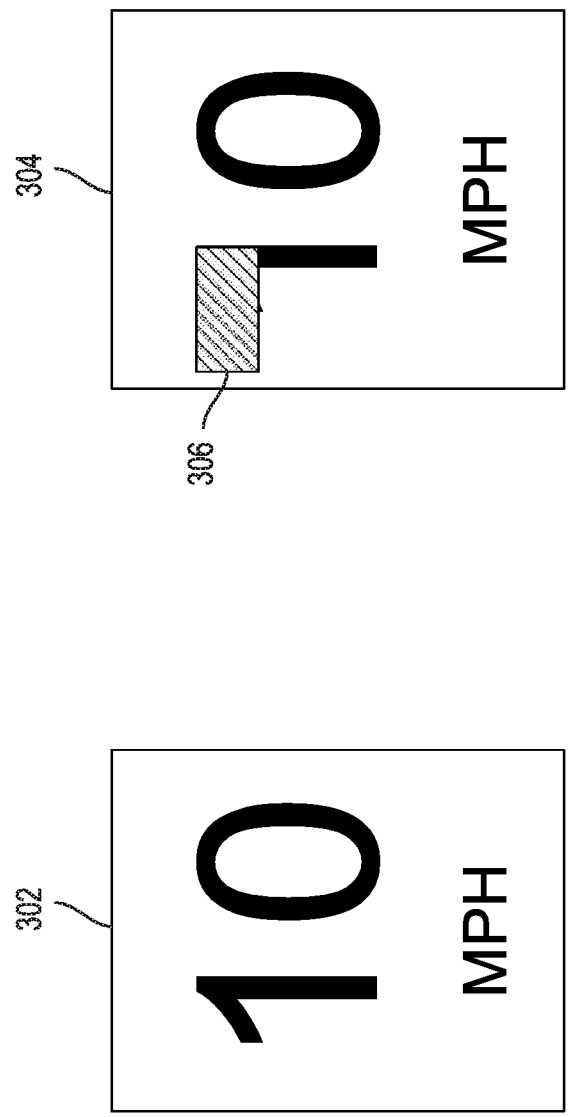
FIGS. 3A and 3B illustrate example road signage, according to some aspects of the disclosed technology.

As shown in FIGS. 3A and 3B, FIG. 3A illustrates an untampered road signage 302 of 10 MPH, while FIG. 3B illustrates a tampered road signage 304 of 70 MPH. In this example, the road signage has been vandalized by placement of reflective tape 306 to change "1" to "7." Under normal circumstances, an autonomous vehicle would detect the speed limit signage and increase the speed of the autonomous vehicle accordingly. However, this can lead to a very dangerous situation where the autonomous vehicle dictates its speed solely on the speed limit posted on the road signage. In such a case, as in FIGS. 3A and 3B, the autonomous vehicle may suddenly increase its speed to 70 MPH, when the surrounding vehicles are only traveling at 10 MPH, potentially causing a collision. However, in some embodiments as described herein, the autonomous vehicle's behavior may be based on the correctly identified speed limit or traffic sign (e.g., by maintaining the speed as designated by a semantic map), in the event that the autonomous vehicle detects that the traffic sign has been tampered with (e.g., measured reflectivity parameters do not match those of the semantic map). In the case, as shown in FIGS. 3A and 3B, the autonomous vehicle may drive at 10 MPH, even though the traffic sign appears to state 70 MPH, based on the reflectivity comparison.

Utilizing changes in reflectivity by the degrading traffic infrastructure system 200 can also be applied to added, removed, or modified road signage. For example, these "changed" road signages will provide different LiDAR intensity/reflective data as compared to the original road signage reflective data. When the degrading traffic infrastructure system 200 detects a change in reflectivity based on the road signage, the road signage can be flagged or placed on a blacklist for review.

Changes in color of signals or other signage can also be detected by the degrading traffic infrastructure system 200 by utilizing the visible spectrum, close ultraviolet (UV), and infrared (IR). The degrading traffic infrastructure system 200 can provide 2D information on the modification of visible colors of infrastructure elements. The degrading traffic infrastructure system 200 can assist in determining changes in other road users' behaviors, as well as flagging degradations or possible future degradations of visibility (e.g., by human eyes) or detectability (e.g., by sensors and algorithms) of such signage. In some instances, the degrading traffic infrastructure system 200 can further determine when traffic lights have changed colors (e.g., the traffic light bulbs were replaced for a different colored bulb).

Figure 4:
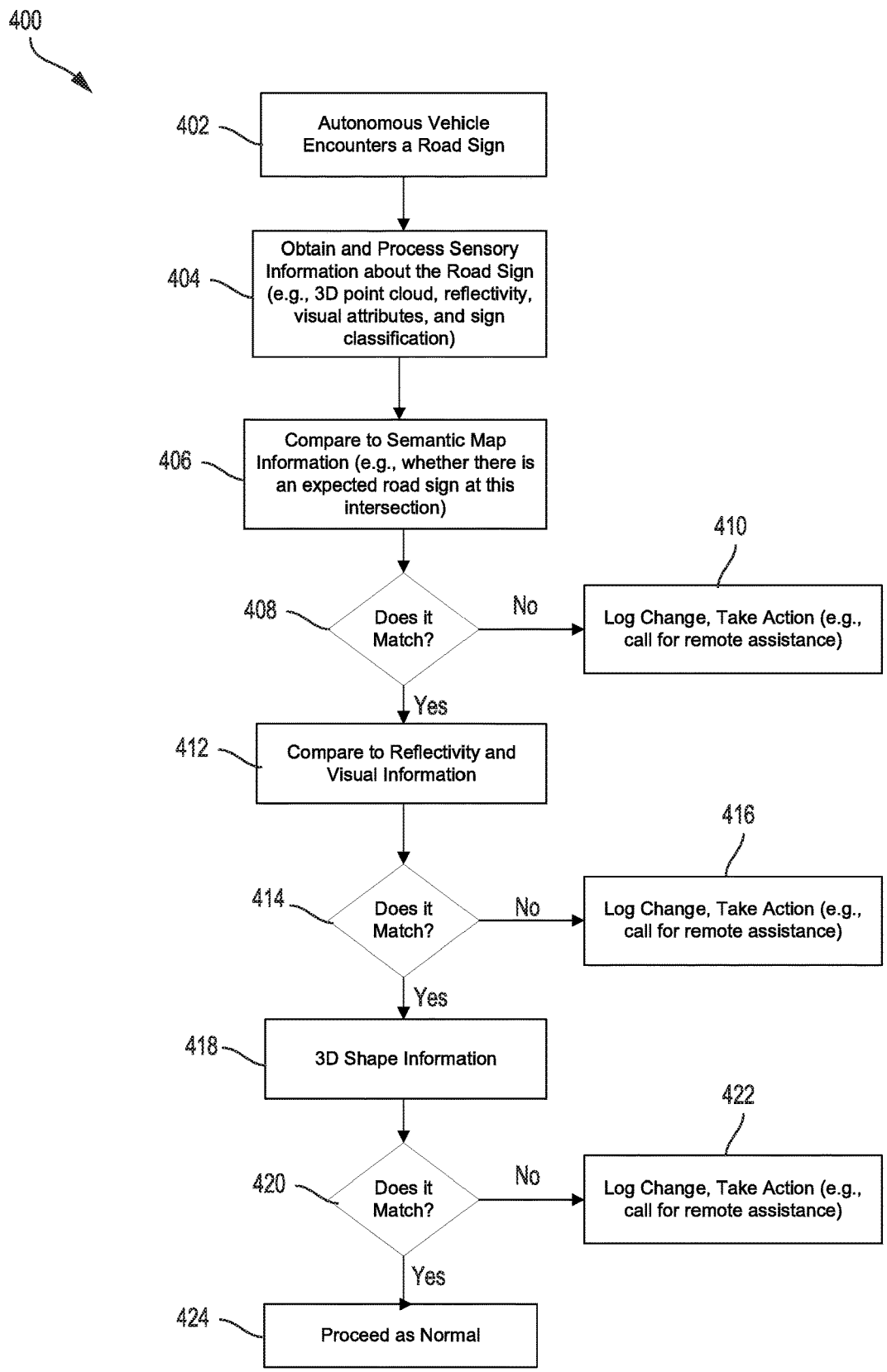
FIG. 4 illustrates an example flow chart of a reflectivity utilization process, according to some aspects of the disclosed technology.

FIG. 4 illustrates an example flow chart of a reflectivity utilization process 400, according to some aspects of the disclosed technology.

In some instances, the reflectivity utilization process 400 can include autonomous vehicles encountering a road sign, traffic light, road marker, traffic controls, constructions zones, or any other traffic infrastructure element suitable for the intended purpose and understood by a person of ordinary skill in the art 402. The reflectivity utilization process 400 can further include obtaining and processing sensory information regarding the road sign 404 (e.g., 3D LiDAR point cloud, reflectivity, visual attributes, and sign classification).

In some instances, the reflectivity utilization process 400 can include comparing the sensory information from step 404 with semantic map information 406 (e.g., whether there is an expected road sign at an intersection). If the sensory information 404 does not match 408 with the semantic map information 406, the change or difference is logged accordingly and a corresponding action is taken 410 such as calling for remote assistance from an operator. If the sensory information 404 does match 408 with the semantic map information 406, the reflectivity utilization process 400 can include comparing the semantic map information 406 with reflectivity and visual information 412.

If the reflectivity and visual information 412 does not match 414 with the semantic map information 406, the change or difference is logged accordingly and a corresponding action is taken 416 such as calling for remote assistance from an operator. If the reflectivity and visual information 412 does match 414 with the semantic map information 406, the reflectivity utilization process 400 can include comparing the semantic map information 406 with 3D shape information 418.

If the 3D shape information 418 does not match 420 with the semantic map information 406, the change or difference is logged accordingly and a corresponding action is taken 422 such as calling for remote assistance from an operator. If 3D shape information 418 does match 420 with the semantic map information 406, the reflectivity utilization process 400 can include instructions for the autonomous vehicle to proceed as normal. The 3D shape information 418 of the road sign can include the exterior 3D shape information that can indicate a particular type of road sign.

In some instances, the reflectivity utilization process 400 can further include repeating steps 402-424 for a plurality of autonomous vehicles (e.g., from an autonomous vehicle fleet) to provide confirmation of a change in reflectivity of the traffic infrastructure element (e.g., a road sign). For example, the autonomous vehicle fleet can provide respective reflectivity measurements of the same traffic infrastructure element to a backend network to determine whether a change (e.g., physical change) has occurred to the traffic infrastructure element. If the reflectivity measurements of the respective autonomous vehicles do not match, then the semantic maps may not yet be updated or revised until the reported change of the traffic infrastructure element has been confirmed. If the reflectivity measurements of the respective autonomous vehicles do match, then the semantic maps may be updated or revised accordingly and provided to the autonomous vehicle fleet for use.

Figure 5:
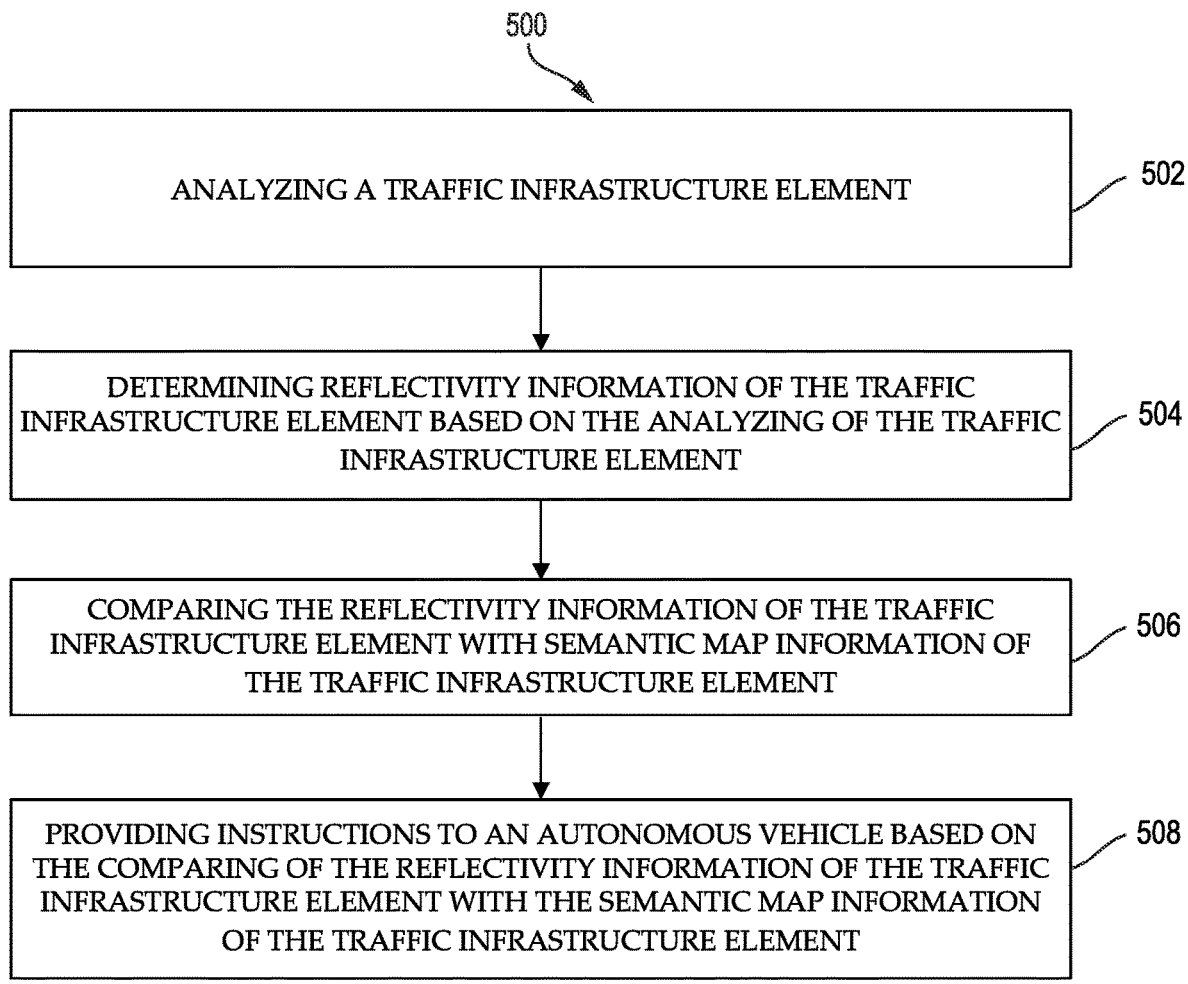
FIG. 5 illustrates an example process for utilizing reflectivity to determine changes to a traffic infrastructure element, according to some aspects of the disclosed technology.

Having disclosed some example system components and concepts, the disclosure now turns to FIG. 5, which illustrate example method 500 for utilizing reflectivity to determine changes to a traffic infrastructure element. The steps outlined herein are exemplary and can be implemented in any combination thereof, including combinations that exclude, add, or modify certain steps.

At step 502, the method 500 can include analyzing a traffic infrastructure element. In some instances, the traffic infrastructure element can be a road sign, a traffic light, signage, or any other traffic infrastructure element suitable for the intended purpose and understood by a person of ordinary skill in the art.

At step 504, the method 500 can include determining reflectivity information of the traffic infrastructure element based on the analyzing of the traffic infrastructure element. In some instances, the reflectivity information of the traffic infrastructure element can be a 3D light detection and ranging (LiDAR) point cloud. In other instances, the reflectivity information of the traffic infrastructure element can be radar information or visual reflectivity/return intensity change information. The method 500 can utilize LIDAR, RADAR, camera, IR, ultrasonic distance detection, or IR thermal cameras to determine the reflectivity information of the traffic infrastructure element.

In some instances, the reflectivity information of the traffic infrastructure element can include reflectivity information of the whole or a portion of the traffic infrastructure element. For example, the whole traffic infrastructure element can include the reflective red portion of a stop sign, while a portion of the traffic infrastructure element can include the reflective numbers of a speed limit sign.

At step 506, the method 500 can include comparing the reflectivity information of the traffic infrastructure element with semantic map information of the traffic infrastructure element. In some instances, the semantic map information of the traffic infrastructure element can include previous reflectivity information of the traffic infrastructure element.

At step 508, the method 500 can include providing instructions to an autonomous vehicle based on the comparing of the reflectivity information of the traffic infrastructure element with the semantic map information of the traffic infrastructure element. In some instances, the providing of the instructions to the autonomous vehicle can include logging a difference between the reflectivity information of the traffic infrastructure element and the semantic map information of the traffic infrastructure element, or proceeding as normal. The undersigned respectfully submits that no new matter is added. Support for the amendments can be found in at least FIGS. 4 and 5 of the originally filed drawings. The amendments to the specification are for clarity purposes only.

The method 500 can further include comparing visual information of the traffic infrastructure element with the semantic map information of the traffic infrastructure element. In some instances, the visual information of the traffic infrastructure element can include color information of the traffic infrastructure element. In other instances, the visual information of the traffic infrastructure element can be determined by utilizing the visible spectrum, close ultraviolet (UV), or infrared (IR).

The method 500 can further include comparing 3D shape information of the traffic infrastructure element with the semantic map information of the traffic infrastructure element. In some instances, the 3D shape information of the traffic infrastructure element can include a type, style, composition, or any other 3D shape information suitable for the intended purpose and understood by a person of ordinary skill in the art.

In some instances, the method 500 can further include repeating steps 502-508 for a plurality of autonomous vehicles (e.g., from an autonomous vehicle fleet) to provide confirmation of a change in reflectivity of the traffic infrastructure element (e.g., a road sign). For example, the method 500 can include the autonomous vehicle fleet providing respective reflectivity measurements of the same traffic infrastructure element to a backend network to determine whether a change (e.g., physical change) has occurred to the traffic infrastructure element. If the reflectivity measurements of the respective autonomous vehicles do not match, then the method 500 may not include updating or revising the semantic maps until the reported change of the traffic infrastructure element has been confirmed. If the reflectivity measurements of the respective autonomous vehicles do match, then the method 500 may include updating or revising the semantic maps accordingly and providing the updated semantic maps to the autonomous vehicle fleet for use.

Figure 6:
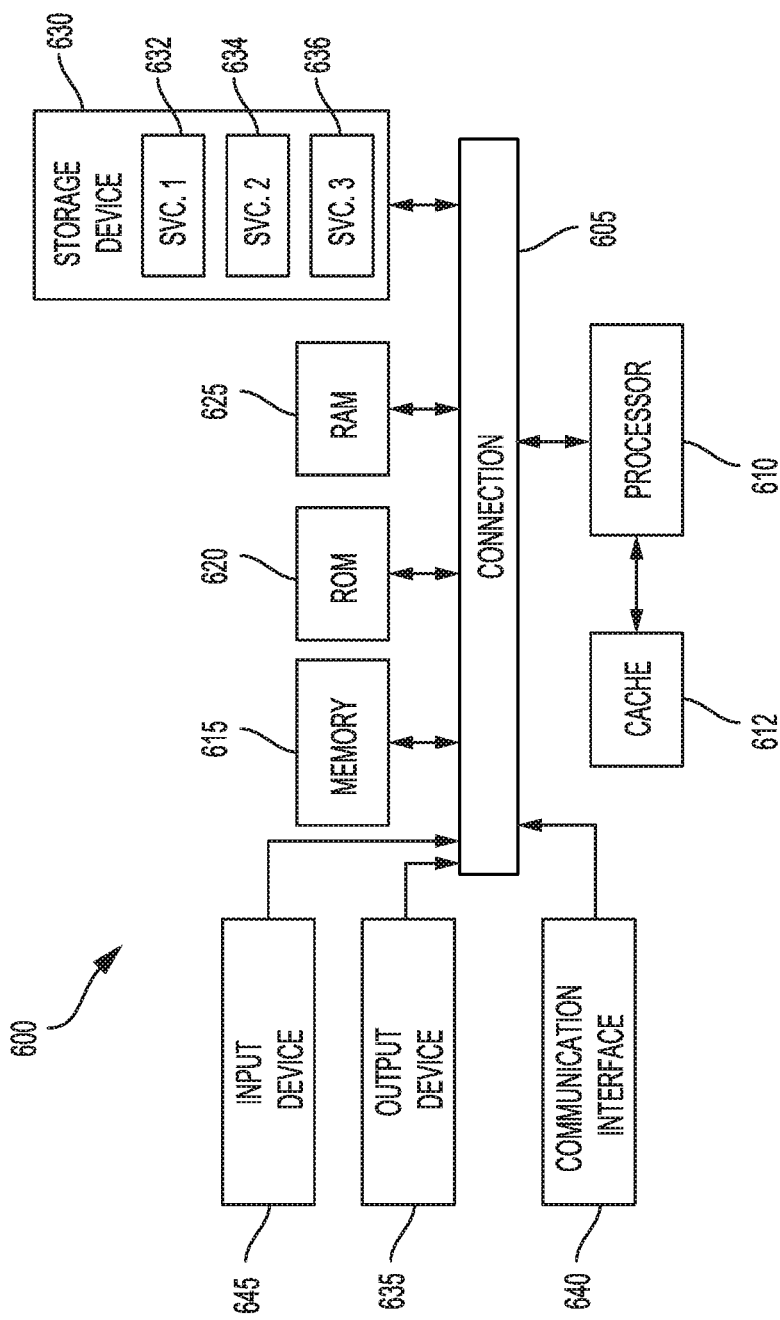
FIG. 6 illustrates an example processor-based system with which some aspects of the subject technology can be implemented.

FIG. 6 illustrates an example computing system 600 which can be, for example, any computing device making up internal computing system 110, remote computing system 150, a passenger device executing rideshare application 170, or any other computing device. In FIG. 6, the components of the computing system 600 are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
analyzing sensor data returned from a traffic infrastructure element, wherein the sensor data includes LiDAR intensity information corresponding to visual characteristics of the traffic infrastructure element;
determining reflectivity information of the traffic infrastructure element based on the analyzing of the sensor data;
comparing the reflectivity information of the traffic infrastructure element with semantic map information of the traffic infrastructure element, wherein:
   the semantic map information is part of a semantic map that is generated based on sensor data captured by a plurality of vehicles and is provided to the plurality of vehicles in response to the sensor data matching across the plurality of vehicles; and
   the semantic map information includes blacklisted road segment information indicating degraded infrastructure that is identified from reflectivity information of the degraded infrastructure in the sensor data captured by the plurality of vehicles;
determining that the reflectivity information of the traffic infrastructure element does not match the semantic map information of the traffic infrastructure element based on a detection that the traffic infrastructure element has been tampered with based on the reflectivity information indicating a change in material of the traffic infrastructure element;
providing instructions to an autonomous vehicle based on the reflectivity information of the traffic infrastructure element not matching the semantic map information of the traffic infrastructure element, wherein the instructions are effective to cause the autonomous vehicle to operate based on the semantic map information instead of the reflectivity information; and
controlling the autonomous vehicle to operate based on the semantic map information according to the instructions and a road utilization quality index that is identified based on the blacklisted road segment information included in the semantic map information.

2. The computer-implemented method of claim 1, wherein the traffic infrastructure element is a road sign, a traffic light, or signage.

3. The computer-implemented method of claim 1, wherein the (Original) semantic map information of the traffic infrastructure element includes previous reflectivity information of the traffic infrastructure element.

4. The computer-implemented method of claim 1, wherein the providing of the instructions to the autonomous vehicle includes logging a difference between the reflectivity information of the traffic infrastructure element and the semantic map information of the traffic infrastructure element.

5. The computer-implemented method of claim 4, wherein the logging the difference for the traffic infrastructure element is performed by a first autonomous vehicle in a fleet of autonomous vehicles, the method further comprises: logging at least a second difference for at least a second traffic infrastructure element received from at least a second autonomous vehicle in the fleet of autonomous vehicles;
compiling a city-wide state of traffic infrastructure from the difference from the first autonomous vehicle and the at least the second difference from the at least the second autonomous vehicle in the fleet of autonomous vehicles.

6. The computer-implemented method of claim 1, further comprising comparing visual information of the traffic infrastructure element with the semantic map information of the traffic infrastructure element.

7. The computer-implemented method of claim 6, wherein the visual information of the traffic infrastructure element includes color information of the traffic infrastructure element.

8. The computer-implemented method of claim 1, wherein the reflectivity information is indicative of a first speed limit, and wherein the semantic map information indicates a second speed limit different from the first speed limit, and wherein the autonomous vehicle operates based on the second speed limit indicated in the semantic map information.

9. The computer-implemented method of claim 1, wherein the determining that the reflectivity information of the traffic infrastructure element does not match the semantic map information of the traffic infrastructure element is performed by a first autonomous vehicle in a fleet of autonomous vehicles, the method further comprising:
confirming that the reflectivity information of the traffic infrastructure element does not match the semantic map information of the traffic infrastructure element by receiving communications from at least a second autonomous vehicle in the fleet of autonomous vehicles indicating that the reflectivity information of the traffic infrastructure element does not match the semantic map information of the traffic infrastructure element.

10. The computer-implemented method of claim 1, wherein the road utilization quality index is generated for each road segment in a region based on analyzing differences between multiple LiDAR data collected at different times and analyzing times and locations where the autonomous vehicles have difficulty navigating.

11. A system comprising:
one or more processors; and
at least one computer-readable storage medium having stored therein instructions which, when executed by the one or more processors, cause the system to:
analyze sensor data returned from a traffic infrastructure element, wherein the sensor data includes LiDAR intensity information corresponding to visual characteristics of the traffic infrastructure element;
determine reflectivity information of the traffic infrastructure element based on the analysis of the sensor data;
compare the reflectivity information of the traffic infrastructure element with semantic map information of the traffic infrastructure element, wherein:
the semantic map information is part of a semantic map that is generated based on sensor data captured by a plurality of vehicles and is provided to the plurality of vehicles in response to the sensor data matching across the plurality of vehicles; and
the semantic map information includes blacklisted road segment information indicating degraded infrastructure that is identified from reflectivity information of the degraded infrastructure in the sensor data captured by the plurality of vehicles;
determine that the reflectivity information of the traffic infrastructure element does not match the semantic map information of the traffic infrastructure element based on a detection that the traffic infrastructure element has been tampered with based on the reflectivity information indicating a change in material of the traffic infrastructure element;
provide instructions to an autonomous vehicle based on the reflectivity information of the traffic infrastructure element not matching the semantic map information of the traffic infrastructure element, wherein the instructions are effective to cause the autonomous vehicle to operate based on the semantic map information instead of the reflectivity information; and
control the autonomous vehicle to operate based on the semantic map information according to the instructions and a road utilization quality index that is identified based on the blacklisted road segment information included in the semantic map information.

12. The system of claim 11, wherein the traffic infrastructure element is a road sign, a traffic light, or signage.

13. The system of claim 11, wherein the reflectivity information of the traffic infrastructure element is a 3D light detection and ranging (LIDAR) point cloud.

14. The system of claim 11, wherein the semantic map information of the traffic infrastructure element includes previous reflectivity information of the traffic infrastructure element.

15. The system of claim 11, wherein the instructions provided to the autonomous vehicle includes logging a difference between the reflectivity information of the traffic infrastructure element and the semantic map information of the traffic infrastructure element.

16. The system of claim 11, wherein the instructions which, when executed by the one or more processors, cause the system to compare visual information of the traffic infrastructure element with the semantic map information of the traffic infrastructure element.

17. The system of claim 16, wherein the visual information of the traffic infrastructure element includes color information of the traffic infrastructure element.

18. A non-transitory computer-readable storage medium comprising:
instructions stored on the non-transitory computer-readable storage medium, the instructions, when executed by one more processors, cause the one or more processors to:
analyze sensor data returned from a traffic infrastructure element, wherein the sensor data includes LiDAR intensity information corresponding to visual characteristics of the traffic infrastructure element;
determine reflectivity information of the traffic infrastructure element based on the analysis of the sensor information;
compare the reflectivity information of the traffic infrastructure element with semantic map information of the traffic infrastructure element, wherein:
the semantic map information is part of a semantic map that is generated based on sensor data captured by a plurality of vehicles and is provided to the plurality of vehicles in response to the sensor data matching across the plurality of vehicles; and
the semantic map information includes blacklisted road segment information indicating degraded infrastructure that is identified from reflectivity information of the degraded infrastructure in the sensor data captured by the plurality of vehicles;
determine that the reflectivity information of the traffic infrastructure element does not match the semantic map information of the traffic infrastructure element based on a detection that the traffic infrastructure element has been tampered with based on the reflectivity information indicating a change in material of the traffic infrastructure element;
provide instructions to an autonomous vehicle based on the reflectivity information of the traffic infrastructure element not matching the semantic map information of the traffic infrastructure element, wherein the instructions are effective to cause the autonomous vehicle to operate based on the semantic map information instead of the reflectivity information; and
control the autonomous vehicle to operate based on the semantic map information according to the instructions and a road utilization quality index that is identified based on the blacklisted road segment information included in the semantic map information.

19. The non-transitory computer-readable storage medium of claim 18, wherein the traffic infrastructure element is a road sign, a traffic light, or signage.

20. The non-transitory computer-readable storage medium of claim 18, wherein the reflectivity information of the traffic infrastructure element is a 3D light detection and ranging (LiDAR) point cloud.

21. The non-transitory computer-readable storage medium of claim 18, wherein the semantic map information of the traffic infrastructure element includes previous reflectivity information of the traffic infrastructure element.

* * * * *